Nov. 13, 1923.  
E. O. HAMREN  
COUPLING DEVICE  
Filed Jan. 17, 1921  
1,473,625  
2 Sheets-Sheet 1

Witnesses:  
W. F. Kilroy  
Harry R. L. White

Inventor:  
Eric O. Hamren  
By [signature]  
Attys

Nov. 13, 1923.
E. O. HAMREN
COUPLING DEVICE
Filed Jan. 17, 1921
1,473,625
2 Sheets-Sheet 2
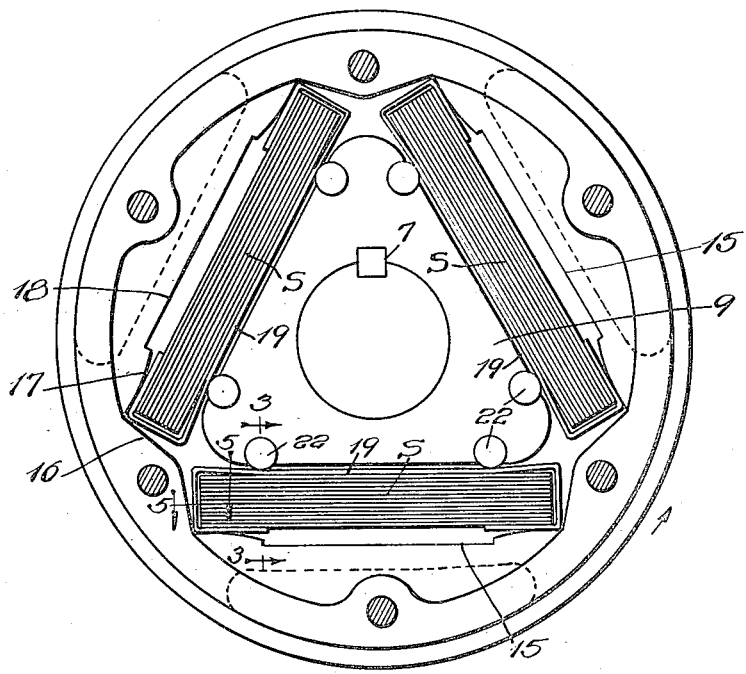
Fig. 2.
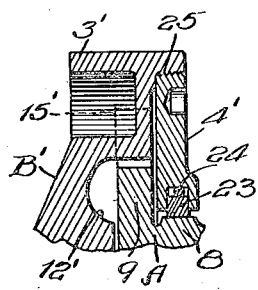
Fig. 7.
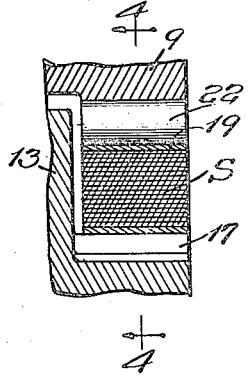
Fig. 3.
Fig. 6.
Witnesses:
W. F. Kilroy
Harry R. L. White
Inventor:
Eric O. Hamren
By Patented Nov. 13, 1923.

1,473,625

UNITED STATES PATENT OFFICE.

ERIC O. HAMREN, OF CHICAGO, ILLINOIS.

COUPLING DEVICE.

Application filed January 17, 1921. Serial No. 437,845.

*To all whom it may concern:*

Be it known that I, ERIC O. HAMREN, a citizen of the United States, residing at Chicago, in the county of Cook and State of Illinois, have invented certain new and useful Improvements in Coupling Devices, of which the following is a description.

My invention relates to improvements in couplings and more particularly to those couplings by which it is desired to transmit power through a resilient means such as springs.

An object of the present invention is to provide a coupling of comparatively simple structure in which an appreciable independent rotary movement is permitted between the driving and driven member, and this is accomplished in my present structure through the medium of a series of laminated spring members arranged substantially tangentially between the inner and outer coupling members, or in the form of chords.

Another object of my invention is to provide a lubricated coupling, wherein I provide simple and effective means for maintaining the lubricant within the device and to automatically spread the ends of the spring laminæ so that the lubricant may enter between said laminæ when the coupling is being driven. Many other objects and advantages of the construction herein shown and described will be obvious to those skilled in the art from the disclosure herein given.

To this end my invention consists in the novel construction, arrangement and combination of parts herein shown and described, and more particularly pointed out in the claims.

In the drawings, wherein like reference characters indicate like or corresponding parts;

Fig. 2 is an end view of the same taken on line 2—2 of Fig. 1;

Fig. 3 is a section on line 3—3 of Fig. 2, with parts broken away;

Fig. 6 is a diagrammatic view showing the spreading action of the laminæ ends when under load; and Fig. 7 is a section showing a modified form of outer coupling members.

Figure 1:
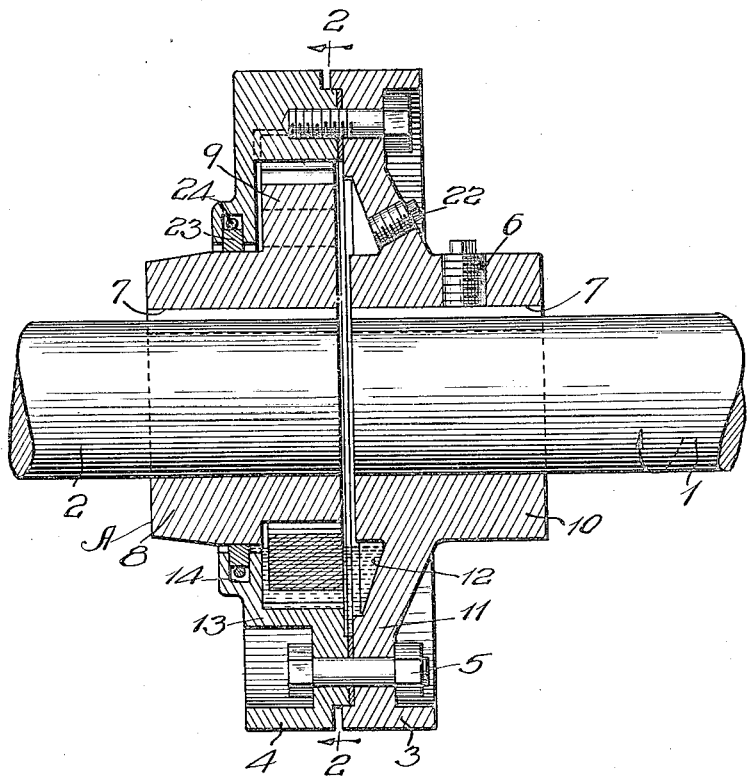
Fig. 1 is a vertical section of a power transmitting device embodying the invention.
Figure 5:
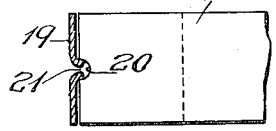
Fig. 5 is a section on line 5—5 of Fig. 2.

Referring more particularly to the drawings, the device is shown as a coupling for transmitting the drive from a shaft 1 to a shaft 2, or vice versa, for in my invention either shaft may be the driving shaft and the other the driven shaft.

A indicates the inner member of the coupling and B the outer member of the coupling, the outer member being formed in this instance of two detachable sections 3 and 4, connected by bolts 5 or the like. Either or both of said members A and B are secured to the shafts by means of suitable set screws 6, and both of the members are formed with the usual key-ways 7.

For the purpose of the description, I will designate the outer member B as the driving member and the inner member A as the driven member. The member A is formed with a sleeve portion 8 for engagement with the shaft 2 and has an enlarged head or flange portion 9, said flange being of any desired polygonal shape, such as triangular, as shown, the sides of the polygon being substantially tangential to the shaft 2.

The part 3 of the member B is provided with a sleeve portion 10 for engagement with the shaft 1, and has an enlarged flange portion 11, the inner face of said flange being recessed at 12 to form an annular oil reservoir therein, said oil reservoir being closed by a removable threaded plug 22.

Detachably secured to the part 3 by the bolts 5 is the disk 4, said part 4 having a radially extending annular flange 13 at the outer side thereof, said flange 13 encircling the shaft and also sleeve 8 of the member A, and also having an annular recess 14 provided in the inner periphery thereof. A gasket 23 of any suitable packing material is adapted to be positioned within said recess 14 and to bear on the sleeve 8 of the member A. A spring 24 may be provided, said spring being arranged so as to encircle the gasket and keep it in proper contact with the sleeve 8 so that the oil in the reservoir may be prevented from escaping.

As seen in Fig. 2, disk 4 is formed with a series of recesses 15 therein, said recesses being equal in number to the number of polygonal sides of the flange 9. Each of these recesses 15 has end shoulders 16, end spring-supporting abutments 17, and a central depression or recess 18 between said end support abutments 17.

Figure 4:
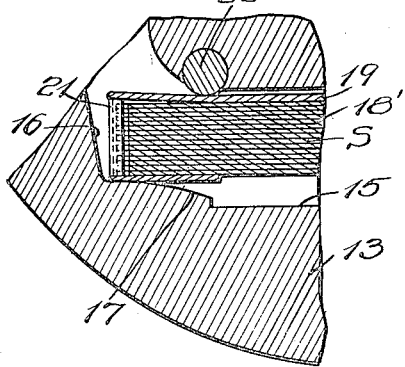
Fig. 4 is a section on line 4—4 of Fig. 3.

As seen in Fig. 4, the abutments 17 have an arcute bearing surface, formed so as to be convex relative to the axes of the aligned shafts, the purpose of said convex surface being hereinafter described.

The polygonal head 9 of the inner member A is adapted to lie concentrically within the disk 4, and resilient members S are positioned between the recesses 15 and the polygonal faces of the head 9, each of the members S comprising a series of laminæ or leaves 18′, said leaves being held together by a strip or band 19 embracing the ends thereof, and the length of said resilient members being less than the distance between the shoulders 16 of the recesses 15, thus providing an end clearance between said resilient members and the end shoulders wherein a slight longitudinal movement may take place. The outer ends of the spring laminæ are spaced a slight distance inwardly of the embracing band 19 so to have end play relative thereto and are centrally recessed as at 20, the band being slotted at 21, and the inturned edges of the slots engaging the walls of the recesses 20 of the laminæ 18′. It will be also noticed, especially in Fig. 4, that the combined depth of the laminæ is less than the distance between the opposed inner surfaces of the ends of the band 19, thus providing a clearance or play space between the spring ends and the upper and lower arms of the band.

Wearing pins 22 are arranged in recesses in the ends of each side of the polygonal head 9 and are adapted to bear on said springs near their ends, said pins being positioned inwardly of the ends of the spring, the distance between centers of the pair of bearing pins of each of the polygonal faces being less than the distance between the outer portions of the spring-supporting abutments 17. The pins 22 are arranged so that their arcuate surfaces are convex relative to the arcuate bearing surface of their adjacent cooperating spring support 17.

When power is applied to the shaft 1, in the direction indicated by arrows in Figs. 1 and 2, the shaft 2 will be rotated, but the initial movement of the shaft will be without shock or jar, for the reason that the resilient member S will flex and provide a resilient engagement between the two drive members.

Fig. 7 represents a modified form of outer coupling member B′, said member having its peripheral flange forwardly extended and internally threaded as at 25. The inner face of said coupling member is annularly grooved as at 12′ to form an oil reservoir, and cooperating with the portion 3′ is a disk 4′, externally threaded, so as to lie within said internally threaded flange 25 and having its inner periphery encircling the sleeve 8 of the member A and being recessed to receive the packing washer 23 and the spring 24 encircling said washer.

There are recesses 15′ provided in the coupling portion 3′, said recesses being similar to recesses 15 of member 3 and adapted to cooperate with the polygonal faces of the flange 9. Springs are positioned between said recesses 15′ and the polygonal faces, as in the modification previously described.

As seen diagrammatically in Fig. 6, when the driving force is applied in the direction shown, the pin 15 will cooperate with the spring 19, causing the laminæ to roll on their support 17 so that the pressure is relieved at the laminæ ends. This relieving of pressure at the ends causes the laminæ ends to spread or open up. The tendency of the spring ends to open up under pressure will always maintain an unbroken oil film, the oil entering between the laminæ at the sides, and at the ends through slots 21, and which aided by the centrifugal and capillary forces will wedge the lubricant between the laminæ and thus keep them "floating" on a film of oil.

It will be apparent that the coupling above described will operate when the shafts are not in alignment as well as when they are in alignment. When the shafts are in alignment the springs deflections will be equal, because the pressures at the point of the spring contacts are equal, but when the shafts are not in alignment the springs deflections and pressures at the point of contact will vary with the offset of the shafts, but will tend to compensate for the variation and will equilibrate the whole system.

Having thus described my invention, it is obvious that various immaterial modifications may be made in the same without departing from the spirit of my invention; hence I do not wish to be understood as limiting myself to the exact form, arrangement, construction and combination of parts herein shown and described or uses mentioned.

What I claim as new and desire to secure by Letters Patent is:

1. A device of the kind described, comprising a pair of coupling members adapted to retain a lubricant therebetween, a spring comprising a series of laminæ intermediate said members to transmit the drive from one to the other, and means for automatically separating the ends of said spring laminæ when power is applied to the driving members of the pair of couplings, whereby the lubricant may enter between said laminæ.

2. A device of the kind described, comprising a pair of coupling members adapted to retain a lubricant therebetween, a spring between said members to transmit the drive therebetween, said spring comprising a series of laminæ, and means for automatically separating the ends of said laminæ when the coupling is transmitting the drive, so that the centrifugal action will force the lubricant between said laminæ ends.

3. In a device of the kind described, comprising a pair of couplings adapted to retain a lubricant therebetween, a spring comprising a series of laminæ intermediate said members to transmit the drive from one to the other, a band embracing the ends of said laminæ and having a slot in communication with said ends, and means for automatically separating the ends of said laminæ when power is applied to the driving member of the pair of couplings, whereby the lubricant may enter said laminæ through said slot.

4. In a device of the kind described, comprising a pair of couplings adapted to retain a lubricant therebetween, a spring comprising a series of laminæ intermediate said members to transmit the drive from one to the other, a band embracing the ends of said laminæ and having a slot communicating with said ends, said band and laminæ ends having an interengaging tongue and groove to prevent lateral displacement between said band and laminæ, and means for automatically separating the ends of said laminæ when power is applied to the driving members of the couplings, whereby the lubricant may enter between said laminæ ends through said slots.

5. A device of the kind described, comprising a pair of coupling members adapted to retain a lubricant therebetween, a spring comprising a series of laminæ intermediate said members to transmit drive from one to the other, a band embracing the ends of said laminæ from top to bottom thereof, the depth of said spring at its ends being less than the distance between the opposed top and bottom sides of said band at its outer end so that the laminæ ends may move relative thereto, and means for separating the ends of said laminæ when power is applied to the driving member of the pair of couplings, whereby the lubricant may enter between said laminæ.

6. A pair of coupling members adapted to retain lubricant therebetween, and means for transmitting the drive between said members, said means comprising a laminated spring intermediate said members, a band encircling the ends of said spring, and supported at its outer ends on one of said members, and means on the other of said members bearing on said band intermediate its supported ends, whereby said laminæ are flexed when the drive is being transmitted and separating the laminæ ends so that the lubricant may enter therebetween.

7. A pair of couplings adapted to be connected to a driving and a driven shaft, each having concentric flanges and spaced arcuate bearings thereon, the bearings of one of said flanges being convex relative to those on the other, a spring comprising a series of leaves arranged between the bearings of both members and offset from said shafts and having its ends in frictional contact with said bearings but free to slide longitudinally relatively thereof, the distance between the mid-point of the spring and its point of contact with the bearing of the outer coupling being greater than the distance between the mid-point of the spring and its bearing with the inner coupling, whereby the spring ends will flex when the drive is being transmitted and cause the ends of the adjacent spring leaves to become separated from each other.

8. In a flexible shaft coupling, a driving member and a driven member, one of which is provided with a series of shouldered recesses therein, and the other of which has a polygonal periphery lying in a plane diametrically perpendicular to the rotational axis thereof, spring members engaging between said recesses and polygonal periphery and lying in said plane longitudinally of said polygonal faces to transmit drive therebetween, one of said coupling members having an annular oil reservoir therein, a gasket at the end of said reservoir, and a spring surrounding said gasket and adapted to hold it in leak-proof contact with its cooperating coupling member.

9. In a device of the kind described and in combination, a pair of coupling members arranged together and constructed to provide a chamber, a spring arranged in said chamber and operatively connecting said members, said spring comprising a series of laminæ, said members constructed to automatically separate the ends of said laminæ during the operation of the coupling whereby the lubricant in said chamber will be drawn between the spring laminæ by capillary attraction.

10. In a device of the kind described and in combination, a pair of coupling members arranged together and constructed to provide a chamber, a spring arranged in said chamber and operatively connecting said members for transmitting the drive therebetween, said spring comprising a series of laminæ, said members constructed to automatically separate the ends of said laminæ during the operation of the coupling, whereby the lubricant in said chamber will enter between the spring laminæ by capillary attraction and pressure on the lubricant due to centrifugal action.

In testimony whereof I have hereunto signed my name in the presence of two subscribing witnesses.

ERIC O. HAMREN.

Witnesses:
 Roy W. Hill,
 Bertha Hartmann.